United States Patent Office 2,919,341
Patented Dec. 29, 1959

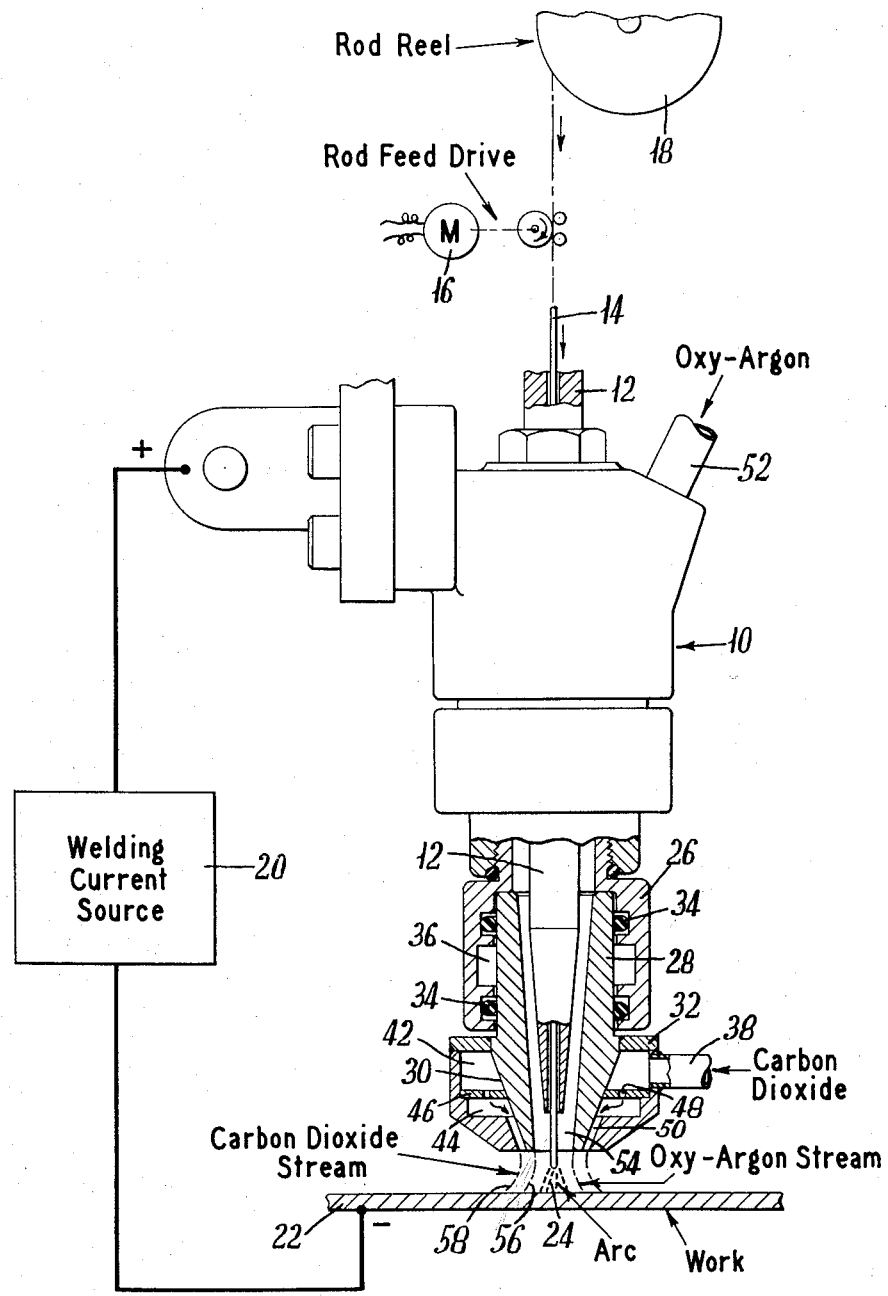

2,919,341

MULTI-GAS SIGMA WELDING

Donald W. Roth, Kenmore, Kenneth L. Thomas, Buffalo, and Charles R. McKinsey, Niagara Falls, N.Y., assignors to Union Carbide Corporation, a corporation of New York Application July 18, 1955, Serial No. 522,759

2 Claims. (Cl. 219—74)

This invention relates to sigma (shielded-inert-gas-metal-arc) welding with a continuous fusible (consumable) metal electrode of wire or rod, and more particularly to such welding within concentric streams of different arc-shielding gases.

According to the invention there is provided a novel process for sigma welding carbon steel work which comprises shielding a welding arc established between a fusible metal electrode of carbon steel and the work, with an inner annular stream of a suitable arc-shielding gas that is relatively light compared with an outer annular stream that is composed of carbon dioxide. The gas of the inner stream preferably is one that promotes stable arcing conditions such as argon alone, a mixture of argon and oxygen, a mixture of argon and helium, a mixture of argon, helium and oxygen, a mixture of argon and carbon dioxide, or of helium, argon and carbon dioxide.

In sigma welding hot rolled steel plate, a stable arc can be maintained with a relatively low flow rate of 6 c.f.h. of an arc-shielding gas composed of a mixture of 5 percent oxygen and the balance argon, but porosity has been objectionable in welds made with such low gas flow. We have discovered, however, that protection of the weld puddle can be improved by means of a double-concentric gas cup, the inner nozzle of which is supplied with such gas, and the outer with a suitable inexpensive gas such as $CO_2$. Such outer gas also gives some protection to the outer plasma of the arc.

Our process of welding steel involves surrounding a consumable metal electrode with two concentric gas streams—a suitable arc-shielding gas on the inside and carbon dioxide on the outside. By the use of this method, the total volume of inner gas necessary for effective welding is reduced. In addition, the surrounding carbon dioxide prevents air contamination by turbulence into the inner atmosphere.

One of the aims in the development of gas-shielded arc welding processes is a reduction in shielding gas costs. Another goal is better, i.e., more stable welding conditions. The subject process provides a novel method for attaining such goals in the consumable-electrode sigma process.

It has hitherto been proposed that, when two or more separate shielding gas streams are utilized in refractory or nonconsumable inert-gas shielded arc welding, the heavier gas should be on the inside, and the lighter gas on the outside. The subject invention radically departs from such procedure by utilizing a relatively light gas (argon, for example, the density of which is 0.1114 pound/cubic feet at S.T.P.) on the inside, and a relatively heavy gas (carbon dioxide, for example, the density of which is 0.1235 pound/cubic feet at S.T.P.) on the outside. One possible explanation for the success of our process is that carbon dioxide is not only somewhat heavier than argon, but also much heavier than air (density 0.0808 pound/cubic feet). Any argon diffusing through the carbon dioxide stream does not cause any undesirable disturbance of the laminar flow, but air is kept from mixing with the argon. Under arc welding conditions, the inner gas shield will be hotter and, therefore, less dense than the outer gas shield. Since we start with a less dense gas inside, the operating densities and related properties of our process thus are quite different from those of the prior art.

We have found that smooth laminar turbulent-free flow (Reynolds number less than about 2,000) of each shielding gas effectively prevents the churning up of air and incorporation of oxygen and/or nitrogen in the protective gas streams.

Tests have indicated that our double-gas cup technique provides an improvement under otherwise standard welding conditions, less interference from drafts, and that the technique permits a greater gas cup spacing from the work than can be tolerated with single gas cups. Under some operating conditions, this is of advantage to the operator since visibility of the welding zone is improved and there is less mechanical interference from the gas cup. Furthermore, the arcing tip of the filler wire is shielded with a gas stream that is conductive to a good welding arc, while the larger heated zone at the workpiece is shielded with an atmosphere that is sufficiently protective thereof and metallurgically acceptable.

In the drawings:

The single figure is a view that is partly diagrammatic and partly in elevation of a sigma welding set-up illustrating the invention, the work and parts of the gun or torch being broken away and shown in section.

The illustrated sigma welding gun or torch 10 is provided with a central tube 12 through which a fusible metal electrode-wire or rod 14 is driven by a rod feed drive comprising a motor 16. Such rod is drawn from a reel 18, and as it passes through the tube 12, an electrical circuit is established which includes a welding current source 20 and the work 22, as well as an arc 24 between the business end of such rod 14 and the work 22. In order to provide a dual-gas shield for such arc, the torch 10 comprises a cylindrical extension 26 within which is mounted a nozzle 28 having a tapered end portion 30 to which is fixed a cup 32. The nozzle 28 is held in place within the extension 26 by O-rings 34, 34 which serve also as water-tight seals when cooling water is circulated about the nozzle in an annular passage 36 in the extension 26.

The cup 32 is provided with a $CO_2$ gas inlet 38, and with an upper annular chamber 42 and a lower annular chamber 44 which are separated by an annular partition 46 having openings 48 the purpose of which is to evenly distribute the gas as it enters a streamlined conical outlet passage 50 formed between the cup 32 and the nozzle 28. Gas for the inner stream is delivered to an inlet 52 near the top of the torch, and such gas is discharged through the interior passage 54 about the rod 14. Thus, in operation, the arc 24 is surrounded by an inner stream 56 of one gas (argon) which is, in turn, surrounded by an outer stream of another gas ($CO_2$) 58.

As an example of the invention, a sigma welding machine operating at 290 amperes and 26 volts (DCRP) was used to weld a bead on ¼ inch thick rimmed steel plate. No. 1 HT rod (1/16 inch diam.) was fed at 155 i.p.m. to form a bead at 15 i.p.m. (traverse) welding speed. A multiple gas cup using a ¼ inch I.D. gas cup in the center was utilized to deliver an inner 13 c.f.h. of 5 percent oxy-argon gas stream around the electrode, and an outer 8 c.f.h. of carbon dioxide gas stream around such inner stream. Good weld beads were obtained.

The following Tables I and II illustrate the difference between oxy-argon gas shielding alone, and combination of carbon dioxide and oxy-argon shielding according to the invention.

*Table I*

[Operating conditions—290 amps., 26 volts (DCRP), 155 i.p.m. wire speed, 15 i.p.m. weld speed, #1 HT rod (1/16 inch dia.), concentric gas cups.]

| Run No. | Shielding gas | Results [1] |
|---|---|---|
| 1 | 9 c.f.h. 5 percent oxy-argon | Totally unacceptable (gross porosity). |
| 2 | 9 c.f.h. 5 percent oxy-argon inside, 8 c.f.h. carbon dioxide outside. | Acceptable under boiler code. |

[1] Porosity standards of the A.S.M.E. Boiler & Pressure Vessel Code (1952).

*Table II*

[Bead welds on rimmed steel; 1/16 #65 wire.]

| Weld No. | Gas cup | Cup spacing, in. | Shielding gas Inner | Shielding gas Outer | Gas flow, c.f.h. Inner | Gas flow, c.f.h. Outer | Draft, m.p.h. | DCRP current, amp. | Arc voltage, volts | Wire speed, i.p.m. | Spatter | Relative porosity |
|---|---|---|---|---|---|---|---|---|---|---|---|---|
| 1 {A | HW-8 [1] | 3/8 | M-5 |  | 15 |  | None | 295-300 | 27-28 | 165 | Medium | F |
| {B | 7-B [2] | 3/8 | M-5 | CO$_2$ | 10 | 10 | None | 305 | 28 | 165 | Light | B |
| 2 {C | HW-8 | 3/8 | M-5 |  | 15 |  | 2½ | 305 | 26-27 | 165 | Medium | F |
| {D | 7-B | 3/8 | M-5 | CO$_2$ | 10 | 15 | 2½ | 305 | 28 | 165 | Light | B |
| 3 {E | HW-8 | 1 | M-5 |  | 20 |  | None | 290-310 | 27½-30 | 210 | Light | F |
| {F | 7-B | 1 | M-5 | CO$_2$ | 20 | 10 | None | 300-310 | 27 | 215 | Light | B |

[1] HW-8 = standard, ½-inch diameter nozzle.
[2] 7-B = ½-inch diameter inner nozzle surrounded by concentric, annular, outer nozzle.
M-5 = 5 percent oxygen + 95 percent argon gas mixture.

EXAMPLES

No. 1 (welds A and B)—gross porosity obtained at flow of 15 c.f.h. of oxy-argon mixture; addition of auxiliary shield of 10 c.f.h. CO$_2$ resulted in sound weld at only 10 c.f.h. oxy-argon.

No. 2 (welds C and D)—gross porosity obtained at flow of 15 c.f.h. of oxy-argon in 2½ mile-per-hour draft; auxiliary shield of 15 c.f.h. CO$_2$ resulted in sound weld at 10 c.f.h. oxy-argon.

No. 3 (welds E and F)—gross porosity obtained at flow of 20 c.f.h. of oxy-argon at cup-to-work spacing of 1 inch; auxiliary shield of 10 c.f.h. CO$_2$ resulted in sound weld at the same oxy-argon flow.

Suitable mixtures of gas for the inner stream are disclosed in patent applications Serial No. 210,397, Serial No. 403,934, and Serial No. 402,406.

Concerning the shape of the outer gas stream, it is most desirable that this stream have a converging conical shape that is streamlined for most effective results.

The #65 wire referred to in Table II is more fully disclosed in applications Serial Numbers 362,147, now abandoned, and 455,795.

We claim:

1. Process of sigma welding steel with a consumable electrode which includes establishing a welding arc between such electrode and a steel workpiece to be welded, shielding the welding arc with an inner annular stream of suitable gas and an outer annular stream of carbon dioxide gas by discharging said inner stream from an inner cup having an inner annular streamlined gas discharge passage surrounding such consumable electrode and simultaneously discharging said outer stream from an outer cup having an annular streamlined outer gas discharge passage surrounding such inner cup and terminating at the same level so that such inner and outer gas streams merge in streamlined relation immediately after their discharge into the open air and evenly distributing such outer gas in an annular chamber in such outer cup before such outer gas is fed to such annular streamlined gas discharge passage, whereby the flow of the outer gas stream is reduced to a value that is no more than about 1.5 times that of such inner gas stream for good welding results, said inner stream being composed of gas that is conducive to stable welding conditions and is relatively lighter than that of said outer stream, such inner gas stream being selected from the class consisting of argon alone, a mixture of argon and oxygen, a mixture of argon and helium, a mixture of argon, helium and oxygen, a mixture of argon and carbon dioxide, and a mixture of helium, argon and carbon dioxide.

2. Process of sigma welding steel as defined by claim 1, in which the oxy-argon mixture is 5 percent oxygen and the balance argon.

References Cited in the file of this patent

UNITED STATES PATENTS

| 2,053,417 | Brace | Sept. 8, 1930 |
| 2,504,867 | Muller | Apr. 18, 1950 |
| 2,522,482 | Olzak | Sept. 12, 1950 |
| 2,591,926 | Gibson et al. | Apr. 8, 1952 |
| 2,753,427 | Yenni et al. | July 3, 1956 |
| 2,859,329 | Lesnewich | Nov. 4, 1958 |

FOREIGN PATENTS

| 148,289 | Australia | Sept. 19, 1952 |
| 297,911 | Switzerland | June 16, 1954 |
| 709,533 | Great Britain | May 26, 1954 |
| 736,241 | Great Britain | Sept. 7, 1955 |
| 746,023 | Great Britain | Mar. 7, 1956 |